UNITED STATES PATENT OFFICE.

JOHN CLIFFORD, OF CAMBRIDGE, MASSACHUSETTS.

IMPROVEMENT IN COMPOSITIONS FOR PRINTERS' INKING-ROLLS.

Specification forming part of Letters Patent No. 191,933, dated June 12, 1877; application filed April 5, 1877.

*To all whom it may concern:*

Be it known that I, JOHN CLIFFORD, of Cambridge, in the county of Middlesex and State of Massachusetts, have invented an Improved Composition for Printers' Inking-Rolls; and I hereby declare that the following is a full, clear, and exact description thereof.

The ordinary printers' inking-rolls now in use are objectionable for the following reasons: They do not possess the requisite degree of "suction"—that is, they do not adhere or cling to the type or "form"—and consequently are incapable of removing the dirt therefrom, and these rolls are not of a sufficiently tough nature, and their surfaces are liable to break, some portion of them sticking to the form, to clean which, remove the "pick," and wash the roll, requires the frequent stoppage of the press, resulting in the loss of much valuable time; the operation of washing the roll also involving the unnecessary waste of ink.

To overcome the above-mentioned objections is the purpose of my invention, which consists in a printer's inking-roll composed of glue, sugar-house sirup, glycerine, water, castor-oil, and olive-oil, compounded in about the proportions and manner now to be described:

I take about twenty-four (24) parts, by weight, of glue, and steep it in cold water. I then dissolve this in about twenty-eight (28) parts of glycerine. After being dissolved, I add about eighteen (18) parts of ordinary sugar-house sirup, nine (9) parts of castor-oil, and nine (9) parts of olive-oil, and stir the mixture quickly until the several ingredients are thoroughly incorporated, the composition being then about the consistency of molasses. I next pour this composition into a mold of the required size and form, provided with a wooden or metal core which serves as the shaft of the roll.

After remaining in a cool place from three to four hours, I remove the roll from the mold and allow it to be exposed, in a horizontal or vertical position, to a dry air for a period of from three to four weeks, when it is well seasoned and ready for use.

An inking-roll composed of the ingredients compounded in the manner and in about the proportions described, in accordance with my invention, possesses the following advantages over the ordinary composition rolls now in use:

My improved roll is extremely durable, and, when worn out, the material of which it is composed may be utilized in the manufacture of other rolls; its surface is tough and elastic, and does not break and stick to the form; possesses the requisite degree of suction— that is, the property of adhering or clinging to the type, necessary for their being kept clean; the washing of the roll and the form, and the loss of time thereby incurred in stopping the press, incident to the use of the ordinary composition roll, being thus avoided.

The castor-oil imparts to the composition a rubber-like spring and toughness, while the olive-oil keeps the surface from assuming a thick, dry skin; hence the quality of my composition is of a most perfect adhesion or suction, the surface of the roll being invariably fresh and tough, and this freshness does not alter by increasing in damp weather, as is common in other compositions for the same purpose, but always keeps the same, and works alike in all temperatures.

Furthermore, no picks occur by the employment of my composition roll, and, as it does not require to be washed to preserve its suction or adhesive property, I am enabled to avoid the great waste of ink heretofore incurred in this operation.

I am aware that a composition of glue, glycerine, and castor-oil used for different purposes; and also compositions for printers' inking-rolls, consisting of glue, glycerine, borax, and ammonia; and also of glue, glycerine, and molasses, are old, and such I do not claim as my invention; but

I claim—

A composition for printers' inking-rolls, consisting of glue, glycerine, sugar-house sirup, water, castor-oil, and olive-oil, compounded in about the proportions herein set forth.

Witness my hand this 31st day of March, 1877.

JOHN CLIFFORD.

In presence of—
N. W. STEARNS,
P. E. TESCHEMACHER.